US009819577B2

(12) United States Patent
Schmutzer et al.

(10) Patent No.: US 9,819,577 B2
(45) Date of Patent: Nov. 14, 2017

(54) ADJUSTING CONTROL-PLANE ALLOCATION OF PACKET PROCESSING RESOURCES

(71) Applicants: Christian Schmutzer, Vienna (AT); Anbu Chezhian Gunalan, San Jose, CA (US); John H. W. Bettink, San Jose, CA (US)

(72) Inventors: Christian Schmutzer, Vienna (AT); Anbu Chezhian Gunalan, San Jose, CA (US); John H. W. Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/725,149

(22) Filed: May 29, 2015

(65) Prior Publication Data

US 2016/0352620 A1 Dec. 1, 2016

(51) Int. Cl.
*H04L 12/707* (2013.01)
*H04L 12/741* (2013.01)
(Continued)

(52) U.S. Cl.
CPC .............. *H04L 45/24* (2013.01); *H04L 43/50* (2013.01); *H04L 45/52* (2013.01); *H04L 45/74* (2013.01); *H04L 47/10* (2013.01); *H04L 49/90* (2013.01)

(58) Field of Classification Search
CPC ......... H04L 43/50; H04L 45/24; H04L 45/52; H04L 45/74; H04L 47/10; H04L 49/90
See application file for complete search history.

(56) References Cited

U.S. PATENT DOCUMENTS 6,785,843 B1 * 8/2004 McRae .................. H04L 45/00
714/23
7,209,449 B2 * 4/2007 Tang ....................... H04L 45/60
370/238
(Continued)

OTHER PUBLICATIONS

"MPLS LDP—Local Label Allocation Filtering," Apr. 11, 2008, Cisco Systems, Inc., San Jose, CA (22 pages).
(Continued)

*Primary Examiner* — Alpus H Hsu
(74) *Attorney, Agent, or Firm* — The Law Office of Kirk D. Williams

(57) ABSTRACT

In one embodiment, configurable policy-based processing of packets is performed, including, but not limited to, using user-configurable parameters to adjust control-plane allocation of resources used in processing of packets. In one embodiment, these resources include, but are not limited to, processing by fast path or slow path forwarding of packets; forwarding information base (FIB) entries, databases, and hardware processing elements; instantiation of sub-FIB databases; and/or selection of sub-FIB data plane entries for population of sub-FIB databases, a group of FIB entries is label switched traffic, fully expanded Internet Protocol routes, loopback addresses of packet switching devices in the network, label-switched to label-switched traffic, Internet Protocol (IP) to label-switched traffic, IP to IP traffic, and/or label to IP traffic. In one embodiment, a group of the plurality of different groups of FIB entries is defined upon how a route or label corresponding to a FIB entry was learned.

19 Claims, 6 Drawing Sheets

(51) Int. Cl.
*H04L 12/781* (2013.01)
*H04L 12/801* (2013.01)
*H04L 12/861* (2013.01)
*H04L 12/26* (2006.01)

(56) References Cited

U.S. PATENT DOCUMENTS

| | | | | |
|---|---|---|---|---|
| 7,415,028 B1* | 8/2008 | Allam | ............... | H04L 61/103 370/395.54 |
| 7,433,969 B2* | 10/2008 | Aggarwal | ............... | H04L 45/00 370/351 |
| 7,447,225 B2* | 11/2008 | Windisch | ............ | H04L 12/1877 370/428 |
| 7,508,829 B2* | 3/2009 | Rangarajan | ......... | H04L 12/5693 370/392 |
| 7,580,351 B2* | 8/2009 | Bettink | ............... | H04L 12/5695 370/230 |
| 7,826,369 B2* | 11/2010 | Filsfils | .................... | H04L 45/00 370/235 |
| 8,139,492 B1* | 3/2012 | Peterson | ................. | H04L 45/00 370/238 |
| 8,391,289 B1* | 3/2013 | Yalagandula | ....... | H04L 12/2818 370/392 |
| 8,467,403 B2* | 6/2013 | Tsier | ...................... | H04L 45/00 370/419 |
| 8,526,437 B2* | 9/2013 | Yumoto | ................... | H04L 45/00 370/242 |
| 8,565,597 B2* | 10/2013 | Zheng | ................. | H04L 12/6418 398/51 |
| 8,611,251 B2* | 12/2013 | Subramanian | ........... | H04L 45/02 370/254 |
| 8,625,592 B2* | 1/2014 | Rajendran | ............... | H04L 45/00 370/392 |
| 8,660,132 B2 | 2/2014 | Assarpour et al. | | |
| 8,750,121 B2* | 6/2014 | Allan | ...................... | H04L 45/24 370/235 |
| 8,873,409 B2* | 10/2014 | Filsfils | .................. | H04L 45/025 370/252 |
| 8,959,215 B2* | 2/2015 | Koponen | ............ | H04L 12/4633 370/396 |
| 9,036,476 B2* | 5/2015 | Grandhi | .................. | H04L 47/52 370/235 |
| 9,167,501 B2* | 10/2015 | Kempf | ................ | H04L 12/4633 |
| 9,253,086 B2* | 2/2016 | Ramanathan | ........... | H04L 45/72 |
| 9,379,982 B1* | 6/2016 | Krishna | ................ | H04L 47/125 |
| 9,485,118 B1* | 11/2016 | Atlas | ................... | H04L 12/5695 |
| 9,491,087 B1* | 11/2016 | Zhang | ..................... | H04L 45/02 |
| 2008/0025309 A1* | 1/2008 | Swallow | ................ | H04L 45/00 370/392 |
| 2011/0134931 A1* | 6/2011 | Merwe | ............... | H04L 41/0816 370/401 |
| 2013/0279503 A1* | 10/2013 | Chiabaut | ................. | H04L 45/44 370/389 |
| 2014/0369356 A1* | 12/2014 | Bryant | .................. | H04L 45/745 370/392 |
| 2015/0312134 A1* | 10/2015 | Kapadia | .................. | H04L 12/44 370/256 |
| 2016/0241463 A1* | 8/2016 | D'Souza | ................. | H04L 45/28 |
| 2016/0269298 A1* | 9/2016 | Li | ........................... | H04L 47/18 |
| 2016/0285753 A1* | 9/2016 | Guleria | .................. | H04L 45/38 |

OTHER PUBLICATIONS

Halpern et al., "Advertising Equal Cost Multipath routes in BGP," draft-bhatia-ecmp-routes-in-bgp-02, Feb. 10, 2006, The Internet Society, Reston, VA (16 pages).

Lapukhov et al., "Use of BGP for routing in large-scale data centers," draft-lapukhov-bgp-routing-large-dc-07, Feb. 6, 2014,The Internet Society, Reston, VA (31 pages).

Nkposong et al., "Experiences with BGP in Large Scale Data Centers: Teaching an old protocol new tricks," Jan. 2014, Japan Network Operators Group, https://www.janog.gr.jp/meeting/janog33/doc/janog33-bgp-nkposong-1-en.pdf (44 pages).

* cited by examiner

ADJUSTING CONTROL-PLANE ALLOCATION OF PACKET PROCESSING RESOURCES

TECHNICAL FIELD

The present disclosure relates generally to processing packets in a communications network including packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
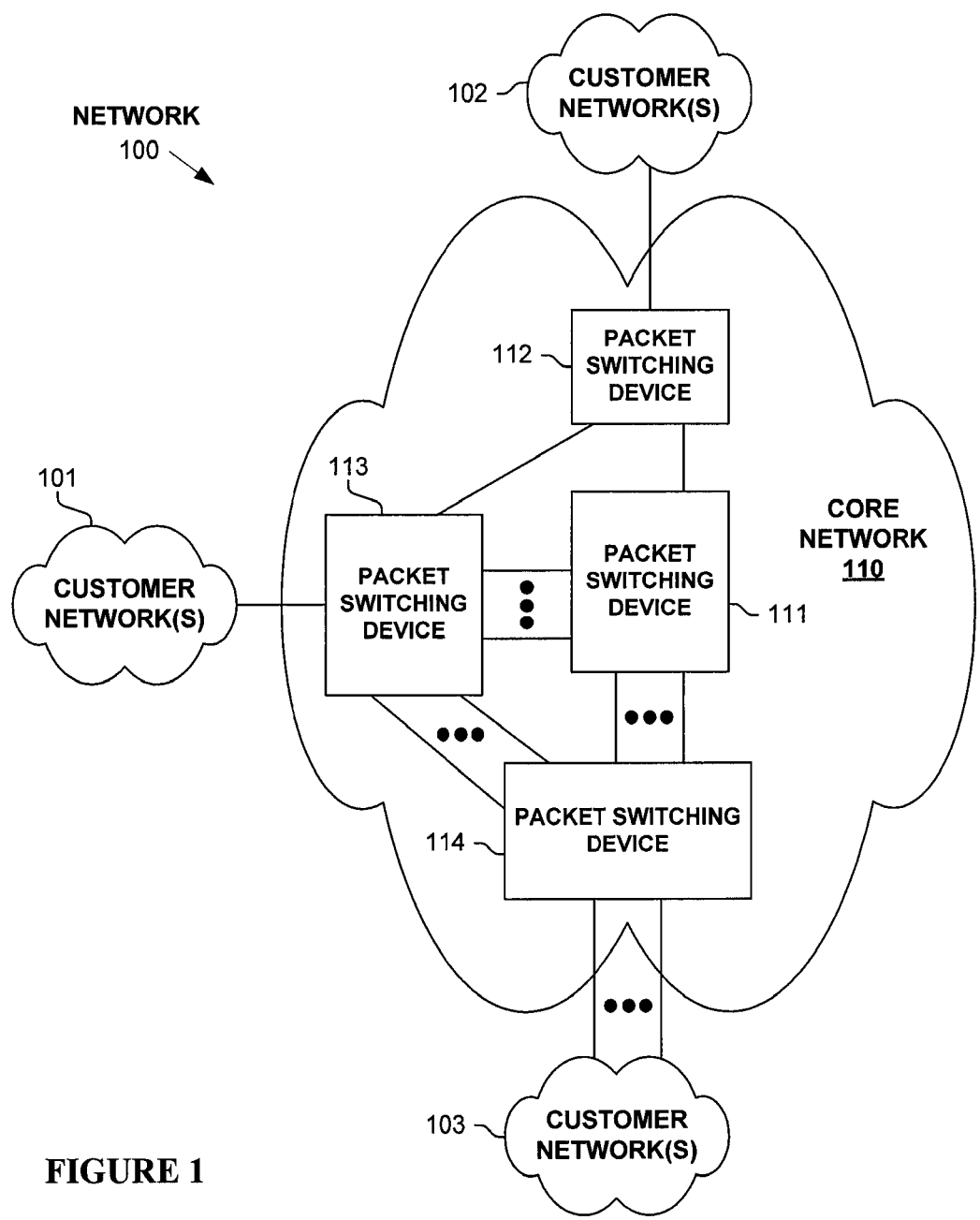
FIG. 1 illustrates a network operating according to one embodiment.

Disclosed are, inter alia, methods, apparatus, computer-storage media, mechanisms, and means associated with configurable policy-based processing of packets, including, but not limited to, user-configurable parameters adjusting control-plane allocation of resources used in processing of packets. In one embodiment, the user-configurable parameters provide different control-plane allocation of resources used in processing of different groups of packets in a same virtual network (e.g., virtual private network). In one embodiment, these resources include, but are not limited to, processing by fast path or slow path forwarding of packets; forwarding information base (FIB) entries, databases, and hardware processing elements; instantiation of sub-FIB databases; and/or selection of sub-FIB data plane entries for population of sub-FIB databases.

One embodiment includes a method, comprising: populating, based on one or more user-configurable control-plane parameters by a control plane of a particular packet switching appliance in a network, data plane entries to be used in data plane processing of packets within the particular packet switching appliance, with said user-configurable control-plane parameters defining a plurality of different groups of forwarding information base (FIB) entries from a forwarding information base of the particular packet switching appliance to be populated in said data plane entries; and data plane-processing, by the particular packet switching appliance, of a plurality of packets based on said populated data plane entries.

In one embodiment, said user-configurable control-plane parameters define at least one of said plurality of different groups of FIB entries to support equal-cost multi-path (ECMP) forwarding, with said data plane entries including entries for performing ECMP forwarding of streams of packets for said at least one of said plurality of different groups of FIB entries, with said populating data plane entries including populating ECMP entries in said data plane entries for said at least one of said plurality of different groups of FIB entries. In one embodiment, data plane processing in the packet switching device is performed by a fast path packet processing by specialized hardware and slow path packet processing using a central processing unit; and wherein said user-configurable control-plane parameters defining that packets corresponding to the plurality of different groups of FIB entries are to be processed via the fast path packet processing.

In one embodiment, a group of the plurality of different groups of FIB entries is label switched traffic, fully expanded Internet Protocol routes, loopback addresses of packet switching devices in the network, label-switched to label-switched traffic, Internet Protocol (IP) to label-switched traffic, IP to IP traffic, and/or label to IP traffic. In one embodiment, a group of the plurality of different groups of FIB entries is defined upon how a route or label corresponding to a FIB entry was learned by the particular packet switching appliance. In one embodiment, said user-configurable control-plane parameters said define the plurality of different groups of FIB entries based on matching criteria of a packet including a field other than an address or label field.

2. Description

Disclosed are, inter alia, methods, apparatus, computer-storage media, mechanisms, and means associated with configurable policy-based processing of packets. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processor may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with configurable policy-based processing of packets. One embodiment includes a method, comprising: populating, based on one or more user-configurable control-plane parameters by a control plane of a particular packet switching appliance in a network, data plane entries to be used in data plane processing of packets within the particular packet switching appliance, with said user-configurable control-plane parameters defining a plurality of different groups of forwarding information base (FIB) entries from a forwarding information base of the particular packet switching appliance to be populated in said data plane entries; and data plane-processing, by the particular packet switching appliance, of a plurality of packets based on said populated data plane entries.

In one embodiment, said user-configurable control-plane parameters define at least one of said plurality of different groups of FIB entries to support equal-cost multi-path (ECMP) forwarding, with said data plane entries including entries for performing ECMP forwarding of streams of packets for said at least one of said plurality of different groups of FIB entries, with said populating data plane entries including populating ECMP entries in said data plane entries for said at least one of said plurality of different groups of FIB entries. In one embodiment, said user-configurable control-plane parameters include a maximum number of equal-cost multi-path routing entries for each different FIB entry. In one embodiment, only said data plane entries corresponding to those groups of said plurality of different groups of FIB entries said defined by said user-configurable control-plane parameters to support ECMP forwarding include an ECMP entry. One embodiment includes instantiating a plurality of sub-FIB databases based on information specified by said user-configurable control-plane parameters. In one embodiment, the plurality of sub-FIB databases include an ECMP database configured for storing said ECMP entries for said at least one of said plurality of different groups of FIB entries supporting ECMP forwarding. In one embodiment, the plurality of sub-FIB databases are configured for only storing ECMP entries for said at least one of said plurality of different groups of FIB entries supporting ECMP forwarding said defined by said user-configurable control-plane parameters.

In one embodiment, data plane processing in the packet switching device is performed by a fast path packet processing by specialized hardware and slow path packet processing using a central processing unit; and wherein said user-configurable control-plane parameters defining that packets corresponding to the plurality of different groups of FIB entries are to be processed via the fast path packet processing. In one embodiment, said user-configurable control-plane parameters defining that packets not corresponding to the plurality of different groups of FIB entries are to be processed via the slow path packet processing.

In one embodiment, said user-configurable control-plane parameters said define the plurality of different groups of FIB entries based on matching criteria of a packet including a field other than an address or label field. In one embodiment, a group of the plurality of different groups of FIB entries is label switched traffic. In one embodiment, a group of the plurality of different groups of FIB entries is fully expanded Internet Protocol routes. In one embodiment, a group of the plurality of different groups of FIB entries is loopback addresses of a packet switching devices in the network. In one embodiment, a group of the plurality of different groups of FIB entries is defined upon how a route or label corresponding to a FIB entry was learned by the particular packet switching appliance. In one embodiment, a group of the plurality of different groups of FIB entries is label-switched to label-switched traffic. In one embodiment, a group of the plurality of different groups of FIB entries is Internet Protocol (IP) to label-switched traffic. In one embodiment, said user-configurable control-plane parameters define that Internet Protocol (IP) to Internet Protocol traffic is not a group of the plurality of different groups of FIB entries.

One embodiment includes packet switching device, comprising: a control plane including one or more route processors, and memory configured to store a forwarding information base (FIB); a data plane including a plurality of interfaces configured to send and receive packets, packet processors, memory configured to store data plane entries, and one or more packet switching mechanisms; wherein the packet switching device is configured to perform operations, with said operations including populating, by the control plane based on one or more user-configurable control-plane parameters, said data plane entries to be used in data plane processing of packets, with said user-configurable control-plane parameters defining a plurality of different groups of FIB entries from the FIB to be populated in said data plane entries; and data plane-processing of a plurality of packets based on said populated data plane entries.

In one embodiment, said user-configurable control-plane parameters define at least one of said plurality of different groups of FIB entries to support equal-cost multi-path (ECMP) forwarding, with said data plane entries including entries for performing ECMP forwarding of streams of packets for said at least one of said plurality of different groups of FIB entries, with said populating data plane entries includes populating ECMP entries in said data plane entries for said at least one of said plurality of different groups of FIB entries. In one embodiment, said operations include instantiating a plurality of sub-FIB databases based on information specified by said user-configurable control-plane parameters. In one embodiment, wherein data plane processing in the packet switching device is performed by a fast path packet processing by specialized hardware and slow path packet processing using a central processing unit; and wherein said user-configurable control-plane parameters defining that packets corresponding to the plurality of different groups of FIB entries are to be processed via the fast path packet processing.

FIG. 1 illustrates a network 100 operating according to one embodiment. Shown are core network 110 including packet switching devices 111-114 (e.g., routers) with packet switching devices 112-114 being edge packet switching devices, and packet switching device 111 being a core packet switching device. Also shown are customer edge nodes (e.g., packet switching devices/routers) 101-103.

One embodiment performs configurable policy-based processing of packets, including, but not limited to, user-configurable parameters adjusting control-plane allocation of resources used in processing of packets. In one embodiment, these resources include, but are not limited to, processing by fast path or slow path forwarding of packets; forwarding information base (FIB) entries, databases, and hardware processing elements; instantiation of sub-FIB databases; and/or selection of sub-FIB data plane entries for population of sub-FIB databases. In one embodiment, a group of the plurality of different groups of FIB entries is label switched traffic, fully expanded Internet Protocol routes, loopback addresses of packet switching devices in the network, label-switched to label-switched traffic, Internet Protocol (IP) to label-switched traffic, IP to IP traffic, and/or label to IP traffic. In one embodiment, a group of the plurality of different groups of FIB entries is defined upon how a route or label corresponding to a FIB entry was learned by the particular packet switching appliance.

As illustrated, some packet switching devices may use a single or multiple links between them, as well as having equal-cost multiple-paths between nodes. It is possible to use equal-cost multi-path (ECMP) forwarding to be used for all types of traffic. However, this typically would require an ECMP data structure entry for each route or label, consuming resources whether ECMP is used for the particular route or prefix.

One embodiment adjusts control-plane allocation of resources used in processing of packets based on user-configurable parameters. In one embodiment, these resources include positively or negatively specifying which groups of forwarding information base (FIB) entries can or cannot use ECMP. In one embodiment in response to these user-configurable parameters, the packet switching device instantiates sub-FIB databases for storing ECMP for routes and/or labels of groups identified by the user-configurable parameters for having ECMP forwarding, and then populates these data plane entries accordingly. In one embodiment in response to these user-configurable parameters, the packet switching device does not instantiate sub-FIB databases for storing ECMP for routes and/or labels of groups not identified by the user-configurable parameters for having ECMP forwarding.

Thus, one embodiment supports selective implementation of ECMP forwarding for groups of traffic defined by these user-configurable parameters, which may be of particular use when resources (e.g., memory, processors) are not large enough to store ECMP data plane entries for all routes and labels. One embodiment allows the operator (e.g., customer) to select the groups of traffic via user-configurable parameters such as, but not limited to, being specified via a network management system, command-line interface, access control list, configuration list, etc. In one embodiment, the user-configurable parameters define to use ECMP for customer data traffic (e.g., label switched traffic) in core network 110, while defining not to use ECMP for management traffic (e.g., IP traffic, IP traffic destined for a loopback address of a packet switching device). In one embodiment, the user-defined configurable parameters define groups of traffic based on any one or more fields or sub-fields of a packet which include, but are not limited to source address, source port, destination address, destination port, protocol type, meta data, data within the payload or elsewhere. In one embodiment, packet classification of packets of data plane packet traffic (which may include using deep packet inspection) is performed accordingly to identify how to process the packet.

Figure 2A:
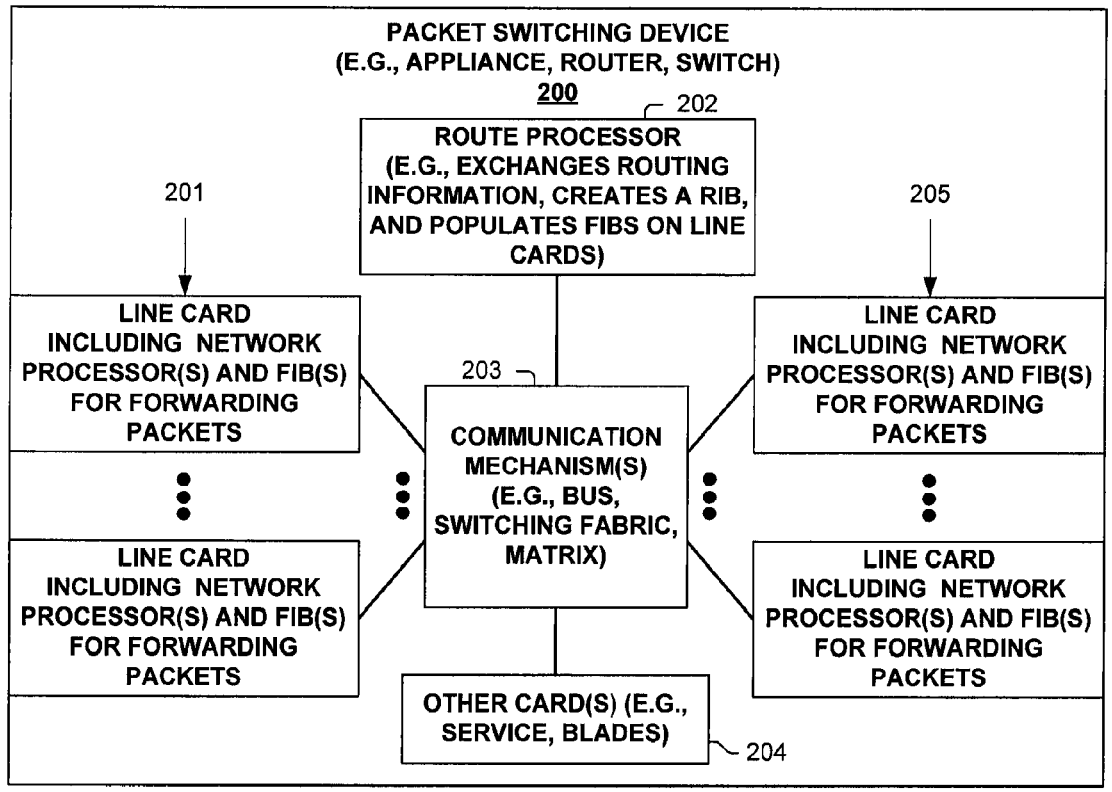
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processors that are used in one embodiment associated with configurable policy-based processing of packets. Packet switching device 200 also has a control plane with one or more processors 202 for managing the control plane and/or control plane processing of packets associated with configurable policy-based processing of packets. Packet switching device 200 also includes other cards 204 (e.g., service cards, blades) which include processors that are used in one embodiment to process packets with selective configuring of throttling engines for flows of packet traffic, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 use command message generation and execution using a machine code-instruction to perform prefix or other address matching on forwarding information bases (FIBs) to determine how to ingress and/or egress process packets. Even though the term FIB includes the word "forwarding," this information base typically includes other information describing how to process corresponding packets.

In one embodiment, the analysis of which interfaces can receive an identified flow of packet traffic is performed by each individual line card 201, 205, possibly singularly or for multiple network processor units, etc. In one embodiment, the analysis of which interfaces can receive an identified flow of packet traffic is performed by route processor 202.

Figure 2B:
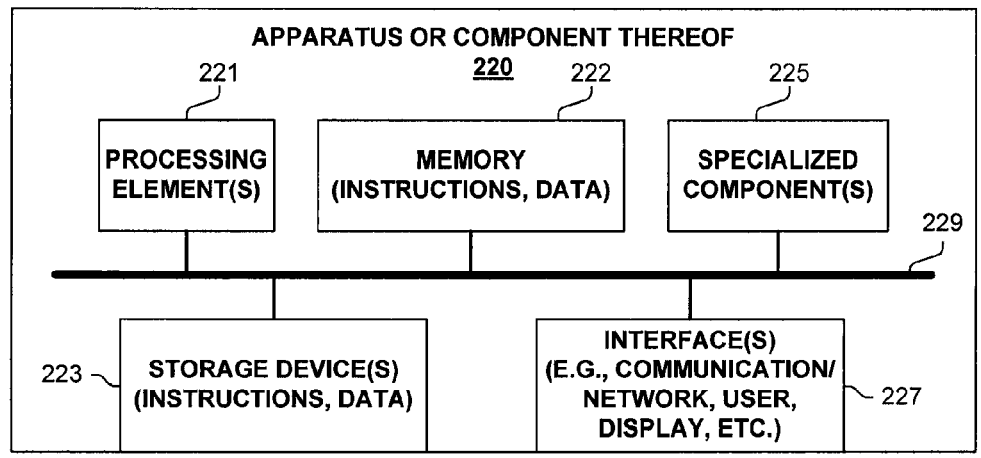
FIG. 2B illustrates an apparatus according to one embodiment.

FIG. 2B is a block diagram of an apparatus 220 used in one embodiment associated with configurable policy-based processing of packets. In one embodiment, apparatus 220 performs one or more processes, or portions thereof, corresponding to one of the flow diagrams illustrated or otherwise described herein, and/or illustrated in another diagram or otherwise described herein. In one embodiment, these processes are performed in one or more threads on one or more processors.

In one embodiment, apparatus 220 includes one or more processor(s) 221 (typically with on-chip memory), memory 222, storage device(s) 223, specialized component(s) 225 (e.g., ternary content-addressable memory(ies) such as for performing flow identification packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3:
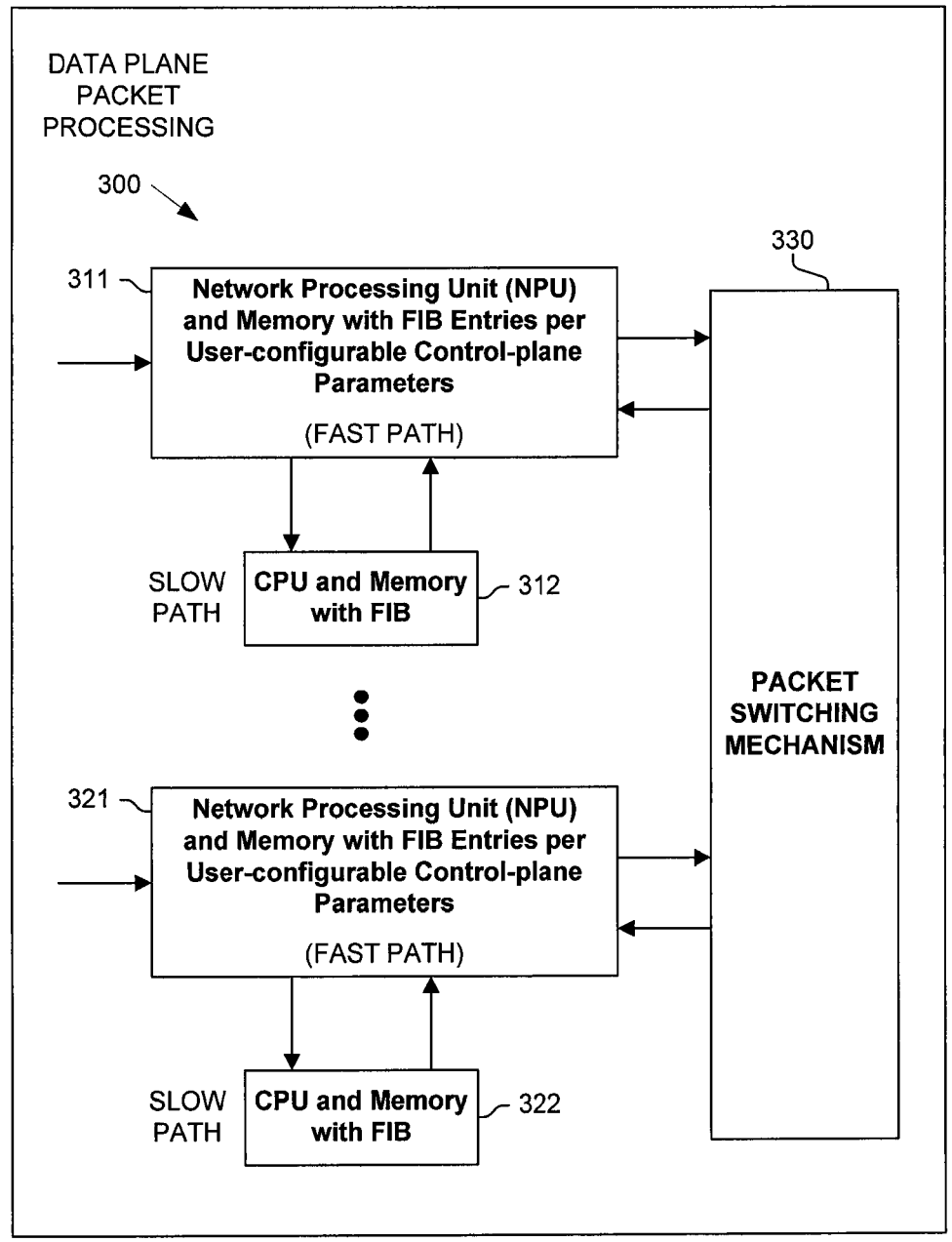
FIG. 3 illustrates data plane processing according to one embodiment.

FIG. 3 illustrates data plane packet processing (300) according to one embodiment. Shown are multiple network processing units (NPUs) 311, 321, with associated central processing units 312, 322, and packet switching mechanism 330. In one embodiment, an NPU is specialized packet processing hardware with limited resources, such as memory or packet processing capability (including completion of the packet processing within a bounded time). Certain packets are "punted" from an NPU to a CPU for packet processing, with this CPU path referred to as "slow path" processing. "Fast path" processing refers to packet processing without forwarding to the CPU.

In one embodiment, CPU and memory 312, 322 include the full forwarding information base (FIB). In one embodiment, NPU and memory 311, 321 include data plane entries which are a subset of the full FIB, with this subset being based on user-configurable control-plane parameters. In one embodiment, the FIB entries in CPU and memory 312, 322 are determined based on user-configurable control-plane parameters. In one embodiment, user-configurable control-plane parameters also determine which particular NPU or NPUs 311, 312 have sub-FIB databases instantiated and correspondingly populated for specified groups of traffic.

Figure 4:
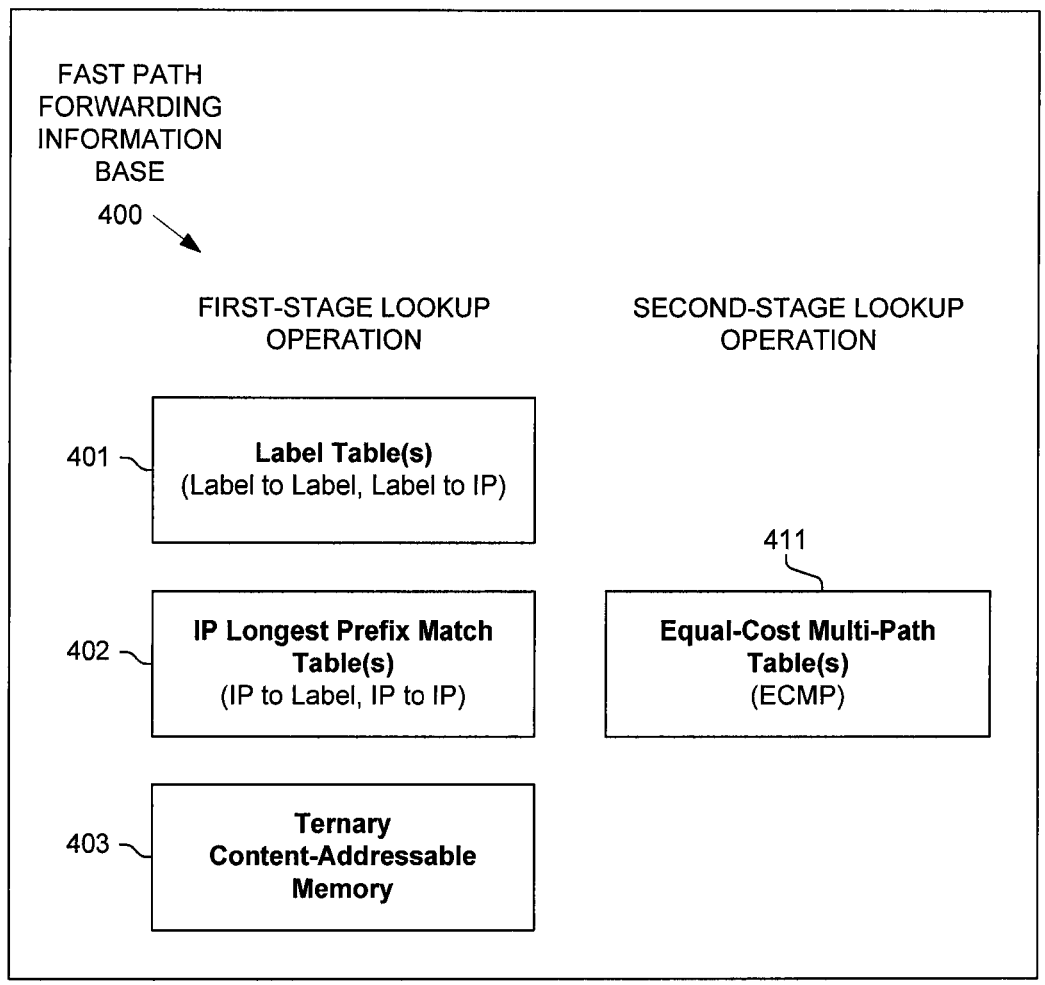
FIG. 4 illustrates data bases used in fast path forwarding in the data plane according to one embodiment.

The data plane entries of an NPU 311, 321 according to one embodiment is shown by fast path forwarding information base 400 of FIG. 4. One embodiment includes label table(s) 401, Internet Protocol (IP) longest prefix matching table(s) 402, and possibly one or more ternary content-addressable memories (TCAMs) 403. In this regards, the term "table" is used generically to refer to any time of data structure for looking up packet processing (e.g., including forwarding) information. Also, shown is equal-cost multi-path table(s) 411 which provide ECMP forwarding information for forwarding information identified by a first-stage lookup operation performed in table(s) 401, 402 and/or TCAM(s) 403. One embodiment tailors the processing of packets based on user-configurable control-plane parameters by correspondingly instantiating table(s) 401, 402 and/or initializing TCAM lookup operations (403) and correspondingly populating table(s) 401, 402 and/or TCAM(s) 403. One embodiment also constrains the number of tables, number of entries per table, and/or number of entries per instantiated group based on user-configurable control-plane parameters. In one embodiment, a user-configurable control-plane parameter specifies a maximum number of ECMP forwarding entries for a route or label which constrains the maximum size of ECMP table(s) 411.

Thus, in one embodiment that does not have sufficient resources to be able to process every packet via fast path processing, groups of packets to be processed by the fast path is defined by the user-configurable control-plane parameters. Based on which, the packet switching device corresponding instantiates and populates databases (e.g., data structures) with FIB entries for fast path processing of packets of these desired groups of packet traffic.

Figure 5A:
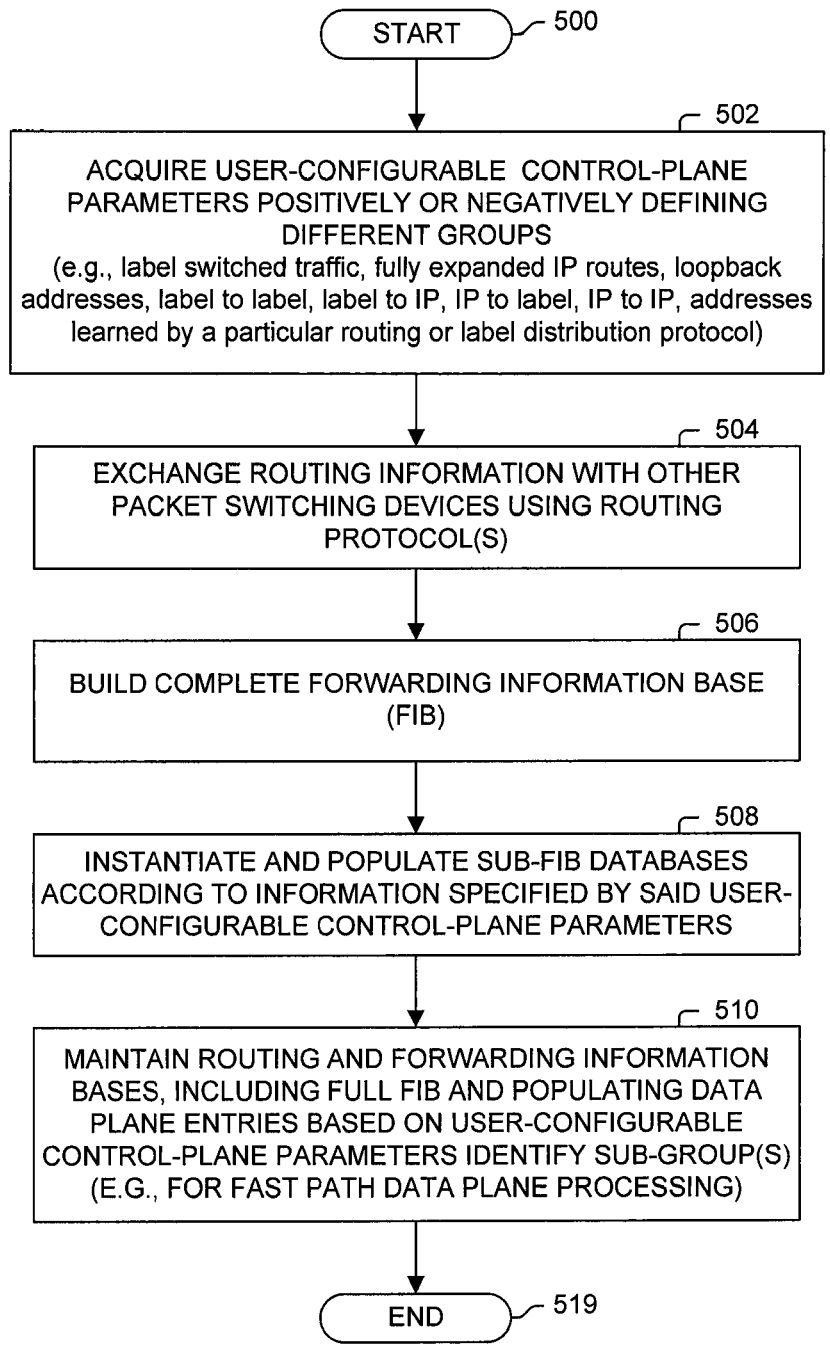
FIG. 5A illustrates a process according to one embodiment.

FIG. 5A illustrates a process performed by one embodiment. Processing begins with process block 500. In process block 502, the user-configurable control-plane parameters are acquired from storage, with these user-configurable control-plane parameters having been provided to the packet switching device via a network management system, command-line interface, access control list, configuration list, etc. In one embodiment, these user-configurable control-plane parameters positively or negatively define different groups of packets, such as, but not limited to, label switched traffic, fully expanded Internet Protocol routes, loopback addresses of packet switching devices in the network, label-switched to label-switched traffic, Internet Protocol (IP) to label-switched traffic, IP to IP traffic, label to IP traffic, and/or based on how a route or label corresponding to a FIB entry was learned by the particular packet switching appliance (e.g., using what routing protocol, from which device it was learned, from which device originated the route/label).

In process block 504, routing information is exchanged with other packet switching devices using one or more routing protocols (referring both to label and route distribution) to build the routing information base (RIB). In process block 506, a complete forwarding information base (FIB) is determined. In process block 508, sub-FIB databases are instantiated and populated in corresponding NPUs (and possibly CPUs) according to information specified by user-configurable control-plane parameters. In process block 510, routing and forwarding information bases are updated, as well as updating the sub-FIB databases as appropriate. Processing of the flow diagram of FIG. 5A is complete as indicated by process block 519.

Figure 5B:
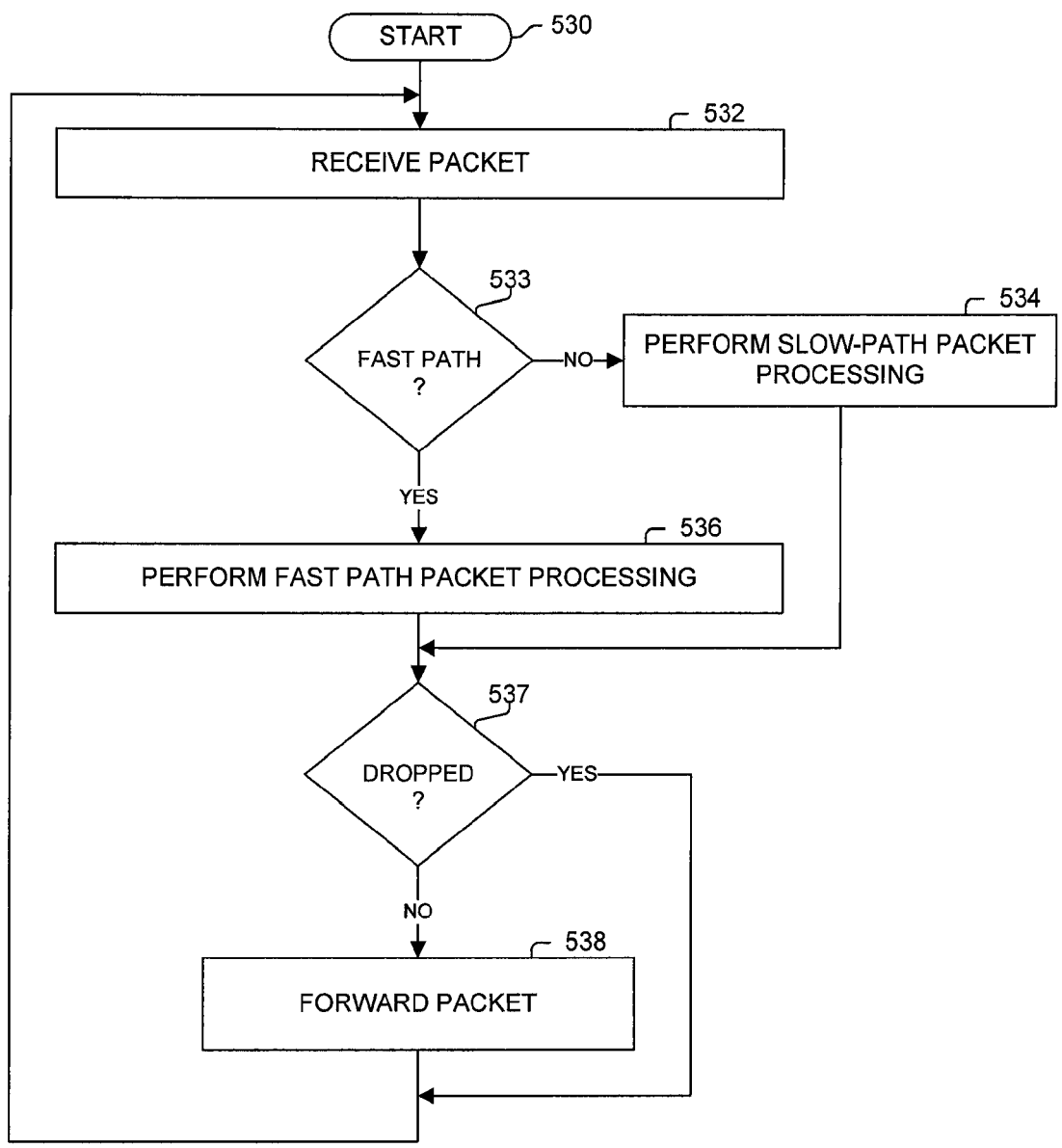
FIG. 5B illustrates a process according to one embodiment.

FIG. 5B illustrates a process performed by one embodiment. Processing begins with process block 530. In process block 532, a packet is received. In process block 533, a determination is made whether to process the packet via the fast path in which fast path processing of the packet is performed in process block 536; otherwise, the packet is processed by the slow path in process block 534. In one embodiment, this determination is made based on packet classification of the received packet (e.g., matching one or more fields or portions thereof) in accordance with the definition of groups of packets based on user-configurable control-plane parameters to identify which of these defined groups the packet belongs. In either event and as next determined in process block 537, if the packet is not dropped, then the packet is forwarded in process block 538. In either event, processing of the flow diagram of FIG. 5B returns to process block 532 to receive and process a next packet.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   populating, based on one or more user-configurable control-plane parameters by a control plane of a particular packet switching appliance in a network from a forwarding information base (FIB) of the particular packet switching appliance, FIB entries into a plurality of different groups of FIB entries defined by said one or more user-configurable control-plane parameters; and
   data plane-processing, by the particular packet switching appliance, of a plurality of packets based on said populated FIB entries;
   wherein said user-configurable control-plane parameters include defining selective implementation of providing or not providing equal-cost multi-path (ECMP) forwarding for the plurality of different groups of FIB entries, with said user-configurable control-plane parameters specifying at least one of the plurality of different groups of FIB entries to support ECMP forwarding, and with the method including associating one or more ECMP entries with one or more FIB entries in said at least one of said plurality of different groups of FIB entries.

2. The method of claim 1, wherein said user-configurable control-plane parameters include a maximum number of equal-cost multi-path entries for each different FIB entry.

3. The method of claim 1, wherein only said FIB entries corresponding to at least one of the plurality of different groups of FIB entries include an ECMP entry used in said data plane-processing of a packet of the plurality of packets.

4. The method of claim 1, comprising: instantiating a plurality of sub-FIB databases based on information specified by said user-configurable control-plane parameters.

5. The method of claim 4, wherein the plurality of sub-FIB databases include an ECMP database configured for storing said ECMP entries for said at least one of said plurality of different groups of FIB entries supporting ECMP forwarding.

6. The method of claim 5, wherein the plurality of sub-FIB databases are configured for only storing ECMP entries for said at least one of said plurality of different groups of FIB entries supporting ECMP forwarding said defined by said user-configurable control-plane parameters.

7. The method of claim 1, wherein said FIB processing in the particular packet switching appliance is performed by a fast path packet processing by specialized hardware and slow path packet processing using a central processing unit; and wherein said user-configurable control-plane parameters defining that packets corresponding to the plurality of different groups of FIB entries are to be processed via the fast path packet processing.

8. The method of claim 7, wherein said user-configurable control-plane parameters defining that packets not corresponding to the plurality of different groups of FIB entries are to be processed via the slow path packet processing.

9. The method of claim 1, wherein said user-configurable control-plane parameters said define the plurality of different groups of FIB entries based on matching criteria of a packet including a field other than an address or label field.

10. The method of claim 1, wherein a group of the plurality of different groups of FIB entries is label switched traffic.

11. The method of claim 1, wherein a group of the plurality of different groups of FIB entries is fully expanded Internet Protocol routes.

12. The method of claim 1, wherein a group of the plurality of different groups of FIB entries is loopback addresses of packet switching devices in the network.

13. The method of claim 1, wherein a group of the plurality of different groups of FIB entries is defined upon how a route or label corresponding to a FIB entry was learned by the particular packet switching appliance.

14. The method of claim 1, wherein a group of the plurality of different groups of FIB entries is label-switched to label-switched traffic.

15. The method of claim 1, wherein a group of the plurality of different groups of FIB entries is Internet Protocol (IP) to label-switched traffic.

16. The method of claim 1, wherein said user-configurable control-plane parameters define that Internet Protocol (IP) to Internet Protocol traffic is not a group of the plurality of different groups of FIB entries.

17. A packet switching device, comprising:
   a control plane including one or more route processors, and memory storing a forwarding information base (FIB);
   a data plane including a plurality of interfaces that send and receive packets, packet processors, memory storing FIB entries, and one or more packet switching mechanisms that communicate packets within the packet switching device;
   wherein the packet switching device performs operations, with said operations including:

populating, by the control plane from the FIB, said FIB entries into a plurality of different groups of FIB entries defined by one or more user-configurable control-plane parameters; and data plane-processing of a plurality of packets based on said populated FIB entries;

wherein said user-configurable control-plane parameters include defining selective implementation of providing or not providing equal-cost multi-path (ECMP) forwarding for the plurality of different groups of FIB entries, with said user-configurable control-plane parameters specifying at least one of the plurality of different groups of FIB entries to support ECMP forwarding, and with said operations including associating one or more ECMP entries with one or more FIB entries in said at least one of said plurality of different groups of FIB entries.

18. The packet switching device of claim 17, wherein said operations include instantiating a plurality of sub-FIB databases based on information specified by said user-configurable control-plane parameters.

19. The packet switching device of claim 17, wherein FIB processing in the packet switching device is performed by a fast path packet processing by specialized hardware and slow path packet processing using a central processing unit; and wherein said user-configurable control-plane parameters defining that packets corresponding to the plurality of different groups of FIB entries are to be processed via the fast path packet processing.

* * * * *